(12) United States Patent
Park et al.

(10) Patent No.: US 6,685,233 B2
(45) Date of Patent: Feb. 3, 2004

(54) SUCTION HOSE ASSEMBLY FOR AN UPRIGHT TYPE VACUUM CLEANER

(75) Inventors: Jung-seon Park, Gwangju (KR); Il-won Yang, Gwangju (KR); Hyung-il Jeon, Gwangju (KR)

(73) Assignee: Samsung Gwangju Electronics Co., Ltd., Gwangju (KR)

( * ) Notice: Subject to any disclaimer, the term of this patent is extended or adjusted under 35 U.S.C. 154(b) by 0 days.

(21) Appl. No.: 10/127,379

(22) Filed: Apr. 22, 2002

(65) Prior Publication Data

US 2003/0146621 A1 Aug. 7, 2003

(30) Foreign Application Priority Data

Feb. 6, 2002 (KR) .......................................... 2002-6638

(51) Int. Cl.[7] ................................................ F16L 27/00
(52) U.S. Cl. .......................... 285/272; 285/7; 285/275; 285/278; 285/280; 285/903
(58) Field of Search ............................ 285/7, 903, 9.2, 285/921, 272, 278, 275, 280

(56) References Cited

U.S. PATENT DOCUMENTS

| | | | |
|---|---|---|---|
| 3,565,464 A | | 2/1971 | Wolf |
| 3,727,949 A | | 4/1973 | Kleykamp et al. |
| 4,174,858 A | | 11/1979 | Brooks |
| 4,462,649 A | | 7/1984 | Medford et al. |
| 4,723,796 A | | 2/1988 | Nattel |
| 4,747,179 A | | 5/1988 | Berfield |
| 4,877,204 A | * | 10/1989 | Gregory et al. .............. 248/298 |
| 5,072,072 A | * | 12/1991 | Bawa et al. ............. 174/65 SS |
| 5,647,846 A | * | 7/1997 | Berg et al. ..................... 604/93 |
| 5,784,757 A | | 7/1998 | Cipolla |

* cited by examiner

Primary Examiner—David Bagnell
Assistant Examiner—G M Collins
(74) Attorney, Agent, or Firm—Ladas & Parry

(57) ABSTRACT

A suction hose assembly for an upright type vacuum cleaner having an air inlet connected to one end of a flexible hose and a suction pipe at the other end. A connection portion movably connects the suction pipe to the flexible hose allowing the suction pipe to rotationally rotate relative to the flexible hose, including a pair of connection protrusions preferably formed on one end of either the suction pipe or flexible hose, and spaced from each other by a predetermined distance, a pair of connection grooves formed on one end of whichever the flexible hose or suction pipe that the connection protrusions are not formed on, to receive the pair of connection protrusions, and at least one guide protrusion provided between a contact surface defined between the connection protrusions and a contact surface defined between the connection grooves, to reduce area of contact defined between the contact surfaces.

11 Claims, 6 Drawing Sheets

SUCTION HOSE ASSEMBLY FOR AN UPRIGHT TYPE VACUUM CLEANER

BACKGROUND OF THE INVENTION

1. Field of the Invention

The present invention relates generally to a vacuum cleaner, and more particularly, to a suction hose assembly for an upright type vacuum cleaner.

2. Description of the Related Art

Generally, an upright type vacuum cleaner has a suction brush 20 as shown in FIG. 1, which is movably disposed on a body 10 of the cleaner to move along a surface to be cleaned during a cleaning operation. The interior of the cleaner body 10 is partitioned into an upper dust collecting chamber and a lower motor driving chamber. In the dust collecting chamber, a dust filter is removably disposed, while a motor is disposed in the motor driving chamber.

In the general upright type vacuum cleaner constructed as above, when the motor is driven, a strong suction force is generated by the suction brush 20, drawing in air and contaminants from the surface to be cleaned, for example, dust and dirt. Accordingly, the air and the contaminants are drawn into the cleaner body 10 through action of the suction brush 20. The drawn in air is discharged into the motor driving chamber through the dust filter disposed in the dust collecting chamber of the cleaner body 10. As the air passes through the dust filter, the contaminants like dust and dirt are filtered out by the dust filter, while the air discharged out through the motor driving chamber is relatively free of contaminants.

Meanwhile, the general upright type vacuum cleaner as described above also has a suction hose assembly 30, that is usually a provided in conjunction with the suction brush 20, to clean hard to reach places that are inaccessible to the suction brush 20 to clean, for example, recesses, doorframes, window frames, or the like.

As shown in FIGS. 1 through 3, the suction hose assembly 30 has a flexible hose 40 connected to an air inlet of the cleaner body 10 with one end thereof, a suction pipe 50, connected to the other end of the flexible hose 40 with one end thereof and selectively connected to an extension hose 21 adjacent the suction brush 20 with the other end thereof, and a connection means 60 that movably connects the suction pipe 50 to the flexible hose 40 so that the suction pipe 50 may be rotated with respect to the flexible hose 40 in a rotary motion.

As shown in FIGS. 2 and 3, the connection means 60 includes a pair of connection protrusions 61 formed on an outer circumference of one end of the suction pipe 50, the protrusions 61 extending in a circumferential direction, and being spaced from each other in a lengthwise direction by a predetermined distance, and a pair of corresponding connection grooves 62 formed on the inner circumference of one end of the flexible hose 40 to correspond to the connection protrusions 61. The connection protrusions 61 are received in the connection grooves 62, and the flexible hose 40 and the suction pipe 50 are movably engaged with each other to relatively rotate, one within the other.

During normal use, the suction brush 20 of the general upright type vacuum cleaner constructed as above, and as shown in FIG. 1, has one end of the suction pipe 50 connected to the extension hose 21, thereby forming an air passage. When the suction hose assembly 30 is used to clean hard to reach places, the suction pipe 50 is separated from the connection with the extension hose 21 of the suction brush 20, to enable it to be used for the cleaning operation. Since the suction pipe 50 is movably engaged with the flexible hose 40 so that the flexible hose 40 may rotate relative to each other in a rotary direction by the engagement of the connection protrusions 61 and the connection grooves 62 of the connection means 60. While the flexible hose 40 may rotate, the suction pipe 50 does not easily separate from the flexible hose 40, allowing a user to conveniently clean the hard to reach places by moving the suction pipe 50.

In the general upright type vacuum cleaner, as constructed above, however, as shown in FIGS. 2 and 3, the flexible hose 40 is engaged with the suction pipe 50 in such a manner that the contact surface 63a between the pair of connection grooves 62 of the flexible hose 40 and the contact surface 63b between the pair of connection protrusions 61 are in full contact. Such a considerably large contact area causes large frictional resistance, which hinders the smooth relative rotational movement of the suction pipe 50, and inconveniences the user.

SUMMARY OF THE INVENTION

The present invention overcomes the above-mentioned problems of the related art, and accordingly, it is an object of the present invention to provide a suction hose assembly of an upright type vacuum cleaner which enables a smooth relative rotational movement of the suction pipe by minimizing the frictional resistance through a reduction of a contact area between the flexible hose and the suction pipe.

The above object is accomplished by providing a suction hose assembly of an upright type vacuum cleaner according to the present invention, including a flexible hose connected to an air inlet of a cleaner body with one end thereof, a suction pipe connected to the other end of the flexible hose with one end thereof, and connected to an extension hose of the suction brush with the other end thereof; connection means for movably connecting the suction pipe to the flexible hose so that the suction pipe can rotate relative to the flexible hose in a rotational direction.

The connection means includes one or a pair of connection protrusions formed on an outer circumference of one end of the suction pipe and if two, spaced apart from each other by a predetermined distance; one or a pair of corresponding connection grooves formed on an inner circumference of one end of the flexible hose to receive each connection protrusion; and at least one guide protrusion provided to be positioned between a contact surface defined between or adjacent the connection protrusions, and a circumferential contact surface defined between the connection grooves, so as to reduce the area of contact defined between the contact surfaces and thereby reduce frictional contact to allow relative rotational motion.

By providing the guide protrusions in a circumferential direction between the suction pipe contact area and the flexible hose contact area, the suction pipe and the flexible hose are movably connected relative to each other on the area of the guide protrusions only. Accordingly, the contact surface between the suction pipe and the flexible hose is greatly decreased, and the frictional resistance between the suction pipe and the flexible hose is also decreased. As a result, the suction pipe can more easily slide within and rotate relative to the flexible hose in a rotational direction.

It is preferable to provide two guide protrusions. The guide protrusions can be formed on the suction pipe contact area in a circumferential direction, or can be formed on the flexible hose contact area in a circumferential direction.

BRIEF DESCRIPTION OF THE DRAWINGS

The above-mentioned objects and the feature of the present invention will be more apparent by describing the preferred embodiment of the present invention by referring to the appended drawings, in which.

DETAILED DESCRIPTION OF THE PREFERRED EMBODIMENT

The preferred embodiment of the present invention will be described below in greater detail by referring to the appended drawings.

Figure 4:
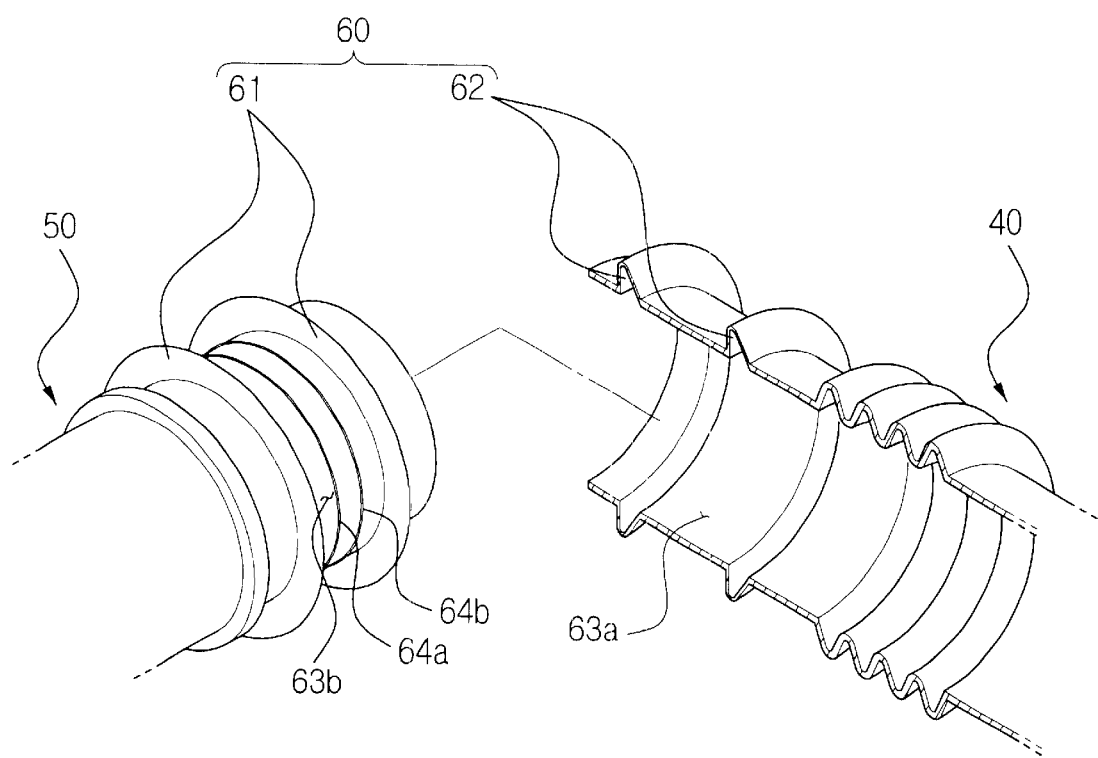
FIG. 4 is an exploded perspective view showing in detail the suction hose assembly of a vacuum cleaner according to a preferred embodiment of the present invention.
Figure 5:
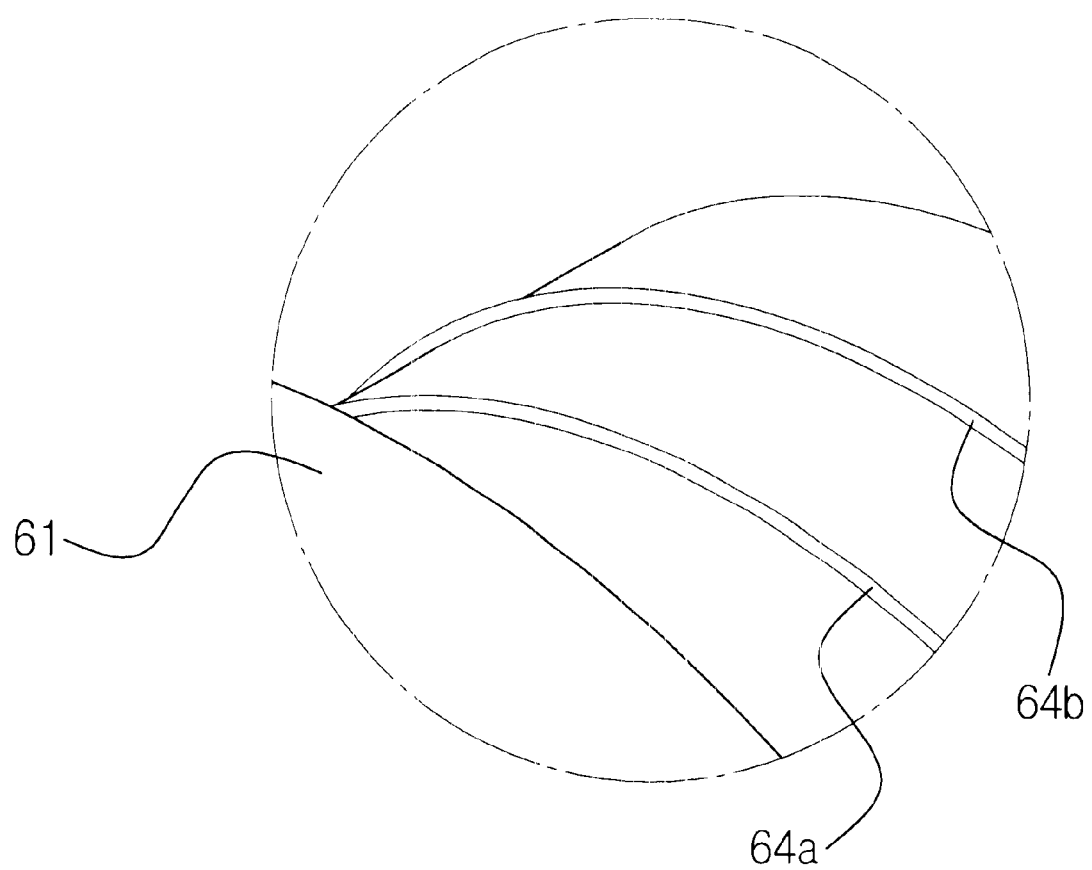
FIG. 5 is a sectional view showing a portion of the suction hose assembly of present invention in greater detail.
Figure 6:
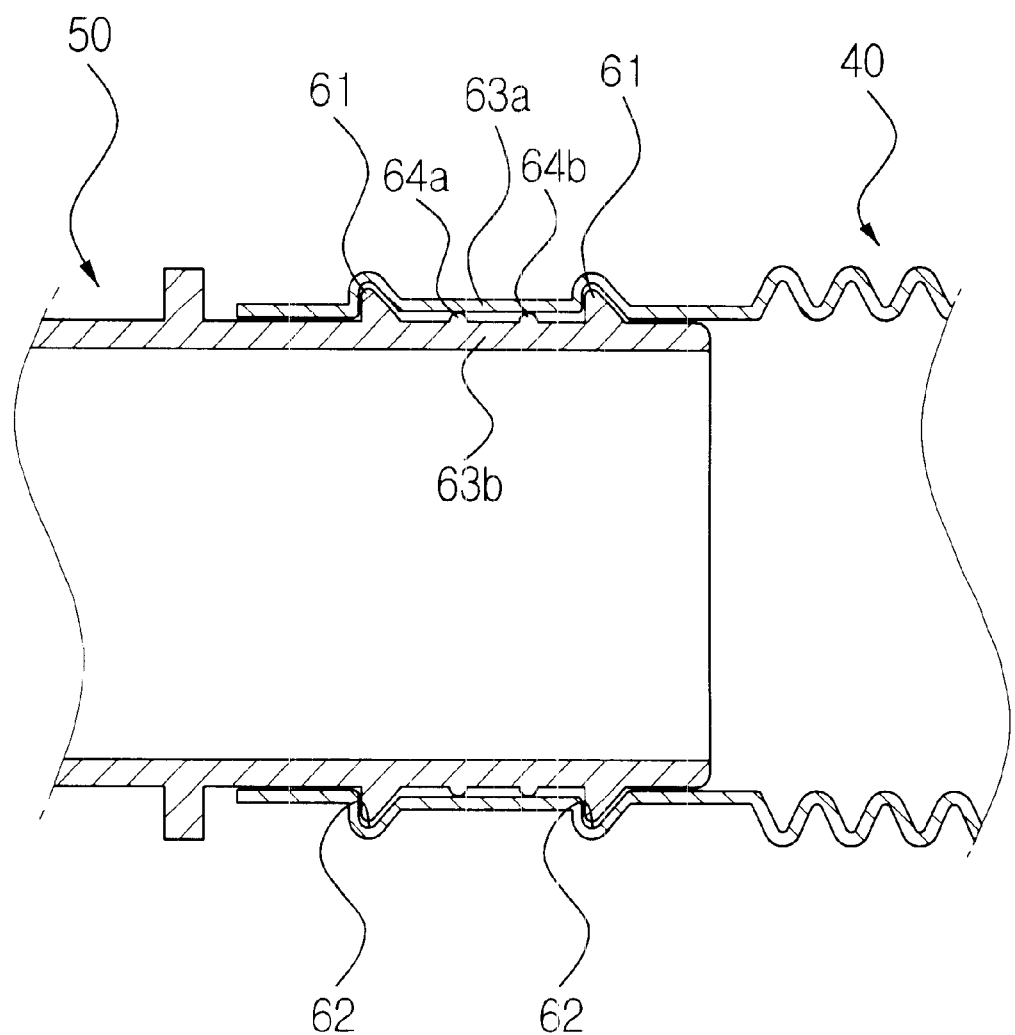
FIG. 6 is a sectional view showing the assembled suction hose assembly of FIG. 4.

FIG. 4 is an exploded perspective view showing in detail the suction hose assembly of a vacuum cleaner according to a preferred embodiment of the present invention. FIG. 5 is a sectional view showing a portion of the present invention in greater detail, and FIG. 6 is a sectional view showing the assembled suction hose assembly of FIG. 4.

As shown in FIG. 4, the suction hose assembly of the upright type vacuum cleaner according to a preferred embodiment of the present invention includes a flexible hose 40, a suction pipe 50, and a connection means 60. Like elements are will be designated herein by identical identification numerals.

Figure 1:
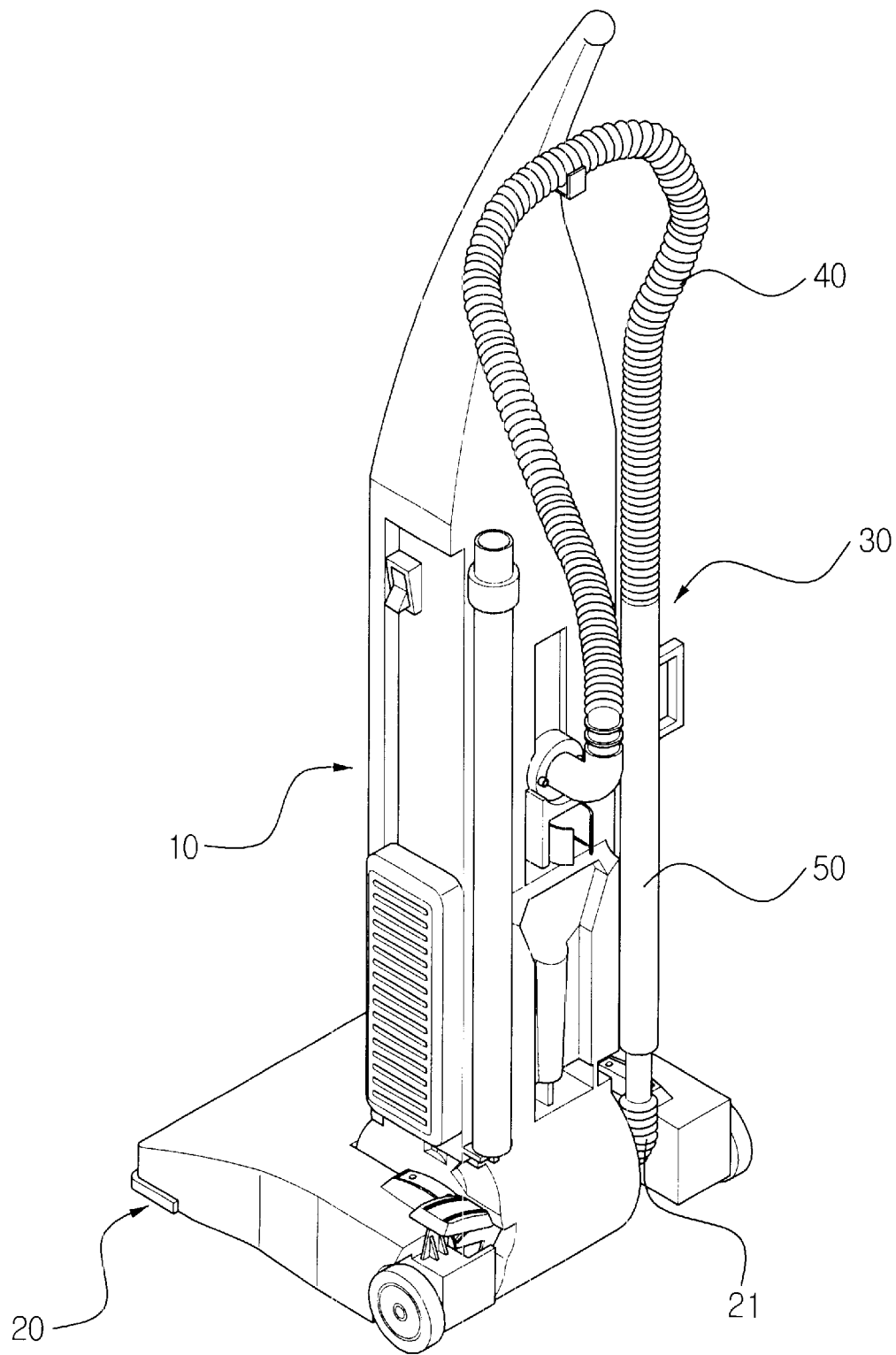
FIG. 1 is a perspective view showing the appearance of a general upright type vacuum cleaner.
Figure 2:
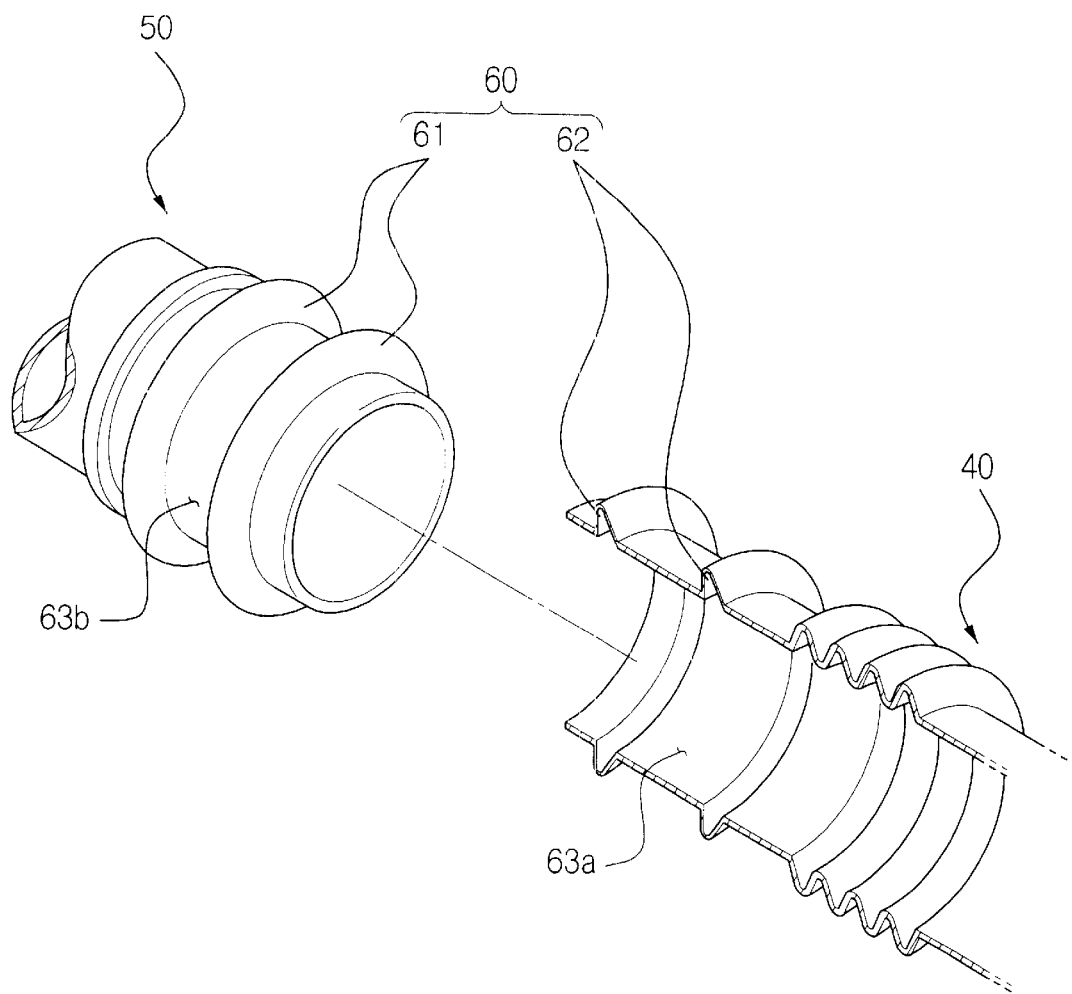
FIG. 2 is an exploded perspective view showing in detail the main portion of the suction hose assembly of the general upright type vacuum cleaner of FIG. 1.
Figure 3:
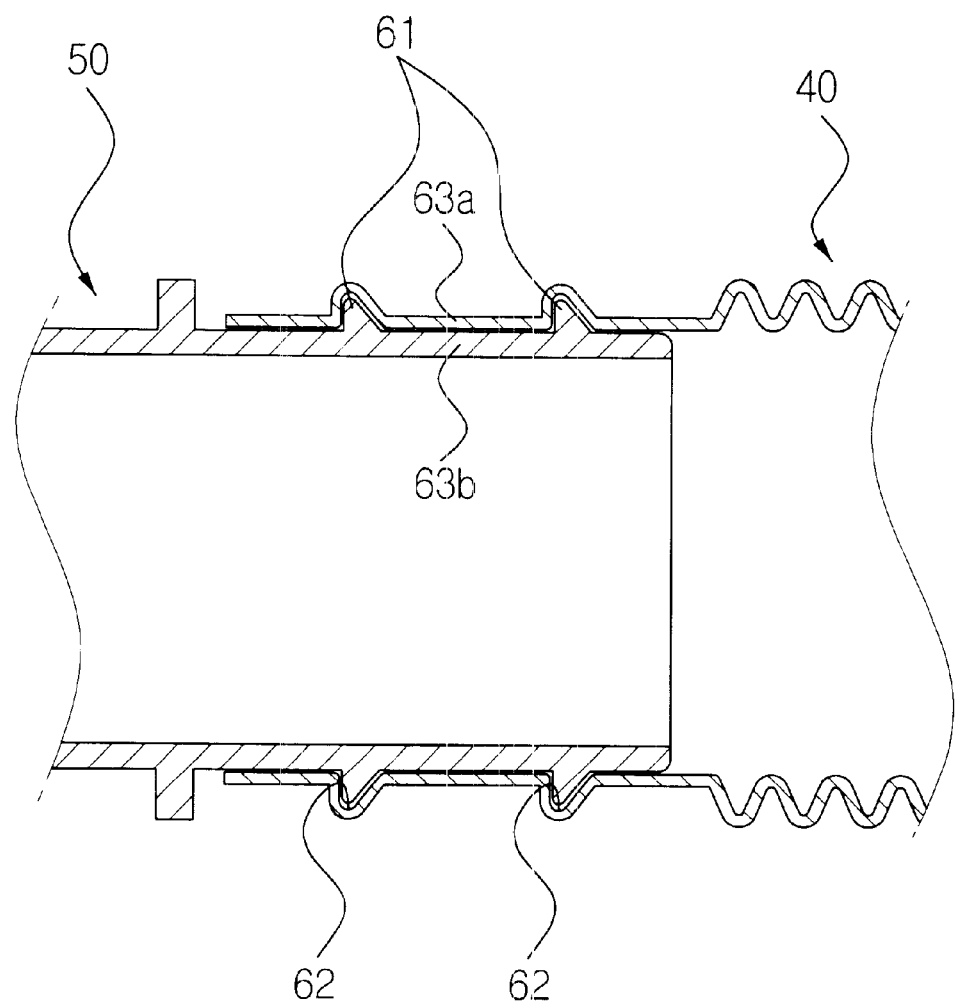
FIG. 3 is a sectional view showing in detail the assembled suction hose assembly of FIG. 2.

The flexible hose 40 is connected to an air inlet of the cleaner body 10 (FIG. 1) with one end thereof, while the one end of the suction pipe 50 is movably connected to the other end of the flexible hose 40 by the connection means 60 so that the suction pipe 50 can be slid on the flexible hose 40 in a relatively rotational direction. The other end of the suction pipe 50 is selectively engaged to the extension hose 21 of the suction brush 20 (FIG. 1).

The connection means 60 functions to connect the flexible hose 40 and the suction pipe 50 in such a manner that the suction pipe 50 slides on the flexible hose 40 to rotate relatively thereto in a rotational direction. And as shown in FIGS. 5 and 6, the connection means 60 has a pair of connection protrusions 61 formed on an outer circumference of an end of the suction pipe 50 and spaced from each other in a lengthwise direction by a predetermined dimension, a pair of connection grooves 62 formed on the inner circumference of an end of the flexible hose 40 to receive the connection protrusions 61, and guide protrusions 64a and 64b disposed to be positioned between the flexible hose contact surface 63a between the connection grooves 62 and the suction pipe contact surface 63b between the connection protrusions 61 to reduce the area of contact between the circumferential surfaces of the suction pipe 50 and the flexible hose 40.

The guide protrusions 64a and 64b are integrally formed on the circumference of the suction pipe contact surface 63b, between the pair of connection protrusions 61 in a circumference direction, and spaced apart from each other in a lengthwise direction by a predetermined distance. The width and thickness of the guide protrusions 64a and 64b are not strictly limited. However, it is preferable for the guide protrusions 64a and 64b to have a narrow width and thickness in order to accomplish the goal of the present invention, i.e., to reduce the contact area between the surfaces of the suction pipe 50 and the flexible hose 40 more effectively.

Although not shown, the guide protrusions 64a and 64b can be formed alternatively or also on the flexible hose contact surface 63a, instead of only on the suction pipe contact surface 63b.

Although this embodiment describes a pair of guide protrusions 64a and 64b by way of an example, a single or multiple guide protrusions may also be employed.

In the cleaning operation, the upright type vacuum cleaner according to the present invention performs the same job, and uses the suction brush, as does any general upright type vacuum cleaner. Accordingly, during normal operation, using the suction brush, one end of the suction pipe 50 is connected to the extension hose of the suction brush, thereby forming an air passage.

Then, using the suction hose assembly to clean hard to reach places, the suction pipe 50 of the suction hose assembly is separated from the connection with the extension hose to clean the hard to reach places, for example, recesses, window frames, door frames, etc. According to the present invention, a user can clean more easily when using the suction pipe 50 since the suction pipe 50 can smoothly rotate relative to the flexible hose 40 than does the conventional upright type vacuum cleaner. In the suction hose assembly of the general type vacuum cleaner, since the suction pipe 50 and the flexible hose 40 are rotationally engaged with each other over a relatively large circumferential contact area, the movement of the suction pipe 50 relative to the flexible hose 40 encountered frictional resistance and was inefficient. According to the present invention, however, and as shown in FIG. 6, the flexible hose 40 and the suction pipe 50 are engaged with each other at a minimum contact area due to the presence of the guide protrusions 64a and 64b. Accordingly, the suction pipe 50 can be rotated relative to the flexible hose 40 more smoothly, and the user can enjoy cleaning with more convenience.

As described above, according to the present invention, by providing the guide protrusions 64a and 64b in the circumferential direction between the suction pipe contact surface 63b and the flexible hose contact surface 63a, the suction pipe 50 can rotate relative to the flexible hose 40 by providing contact over the area of the guide protrusions 64a and 64b only. As a result, the contact area between the suction pipe 50 and the flexible hose 40 is greatly decreased, and due to the decrease of frictional resistance, the suction pipe 50 can rotate over the flexible hose 40 more smoothly. Accordingly, the user can enjoy cleaning with improved convenience.

Although preferred embodiments of the present invention have been described, it will be understood by those skilled in the art that the present invention should not be limited to the described preferred embodiments, but that various changes and modifications can be made while remaining within the spirit and scope of the present invention as defined by the appended claims. Such changes may include, for example, providing the connection grooves 62 on the suction pipe 50 while providing the connection protrusions on the flexible hose, or providing the guiding protrusions on both of the contact surfaces of the flexible hose and suction pipe.

What is claimed is:

1. A suction hose assembly for an upright type vacuum cleaner, comprising:

a flexible hose having an end of the flexible hose connected to an air inlet of a cleaner body;

a suction pipe having an end of the suction pipe connected to the other end of the flexible hose, and the other end of the suction pipe connected to an extension hose of a suction brush;

connection means for movably engaging the suction pipe to the flexible hose, so that the suction pipe can rotate relative to the flexible hose in a rotational direction, the connection means comprising:

at least one connection protrusion formed on an outer circumference of the end of the suction pipe that is connected to the flexible hose;

at least one corresponding connection groove formed on an inner circumference of the end of the flexible hose that is connected to the suction pipe, to receive each of the at least one connection protrusion of the suction pipe; and at least one circumferentially extending guide protrusion provided to be positioned between a contact surface of the suction pipe defined adjacent the at least one connection protrusion, and a contact surface of the flexible hose defined adjacent the at least one connection grooves so as to reduce the contact area between the circumferential contact surfaces of the suction pipe and the flexible hose, thereby permitting the flexible hose to be easily rotatable in a rotational direction relative to the suction pipe.

2. The suction hose assembly of claim 1, comprising at least two guide protrusions.

3. The suction hose assembly of claim 1, wherein said at least one guide protrusion is formed on the contact surface of the suction pipe in a circumferential direction.

4. The suction hose assembly of claim 1, wherein said at least one guide protrusion is formed on the contact surface of the flexible hose in a circumferential direction.

5. The suction hose assembly of claim 1, comprising more than one guide protrusion, and the guide protrusions are provided on both the contact surfaces of the flexible hose and suction pipe.

6. The suction hose assembly of claim 1, comprising at least two connection protrusions on said suction pipe and at least two connection grooves on said flexible hose, said at least one guide protrusion further comprising at least two guide protrusions being disposed on a contact surface between each said connection protrusions or said connection grooves.

7. A suction hose assembly for an upright type vacuum cleaner, comprising:

a flexible hose with an end of the flexible hose connected to an air inlet of a cleaner body;

a suction pipe with an end of the suction pipe connected to the other end of the flexible hose, and the other end of the suction hose connected to an extension hose of a suction brush;

connection means for movably engaging the suction pipe to the flexible hose, so that the suction pipe can slide on the flexible hose in a rotational direction, the connection means comprising:

a pair of connection protrusions formed on an inner circumference of the end of the flexible hose that is connected to the suction pipe, and spaced apart from each other by a predetermined distance;

a pair of connection grooves formed on an outer circumference of the end of the suction pipe that is connected to the flexible hose, to receive the pair of connection protrusions; and at least one circumferentially extending guide protrusion provided to be positioned between a contact surface of the flexible hose, defined between the connection protrusions, and a contact surface of the suction pipe, defined between the connection grooves, thereby permitting the flexible hose to be easily rotatable in a rotational direction relative to the suction pipe.

8. The suction hose assembly of claim 7, wherein the connection means further comprises two guide protrusions.

9. The suction hose assembly of claim 7, wherein said at least one guide protrusion is formed on the contact surface of the suction pipe in a circumferential direction.

10. The suction hose assembly of claim 7, wherein said at least one guide protrusion is formed on the contact surface of the flexible hose in a circumferential direction.

11. The suction hose assembly of claim 7, wherein the connection means further comprises more than one guide protrusion, and the guide protrusions are provided on both the contact surfaces of the flexible hose and suction pipe.

* * * * *